United States Patent [19]

Kowarski

[11] 3,977,935

[45] Aug. 31, 1976

[54] METHOD AND APPARATUS FOR EVAPORATING LIQUIDS

[76] Inventor: Allen Avinoam Kowarski, 2405 Sugarcane Road, Baltimore, Md. 21209

[22] Filed: Sept. 25, 1974

[21] Appl. No.: 509,270

[52] U.S. Cl. .................................. 159/23; 159/1 R; 159/DIG. 11; 159/DIG. 16; 159/44; 159/47 R
[51] Int. Cl.² ........................................... B01D 1/00
[58] Field of Search ....... 159/1 R, 1 A, 2 R, DIG. 1, 159/DIG. 11, DIG. 16, 44, 23, 47 R; 23/258.5, 230, 259 NG, 253 R; 73/423 A

[56] References Cited
UNITED STATES PATENTS

| | | | |
|---|---|---|---|
| 2,064,609 | 12/1936 | Humble | 159/44 |
| 2,434,672 | 1/1948 | Pattee | 159/2 R X |
| 2,496,054 | 1/1950 | Hoyler | 159/DIG. 1 |
| 2,744,629 | 5/1956 | Vine | 159/DIG. 1 |
| 2,957,773 | 10/1960 | Toulmin, Jr. | 159/DIG. 5 |
| 2,969,111 | 1/1961 | Bocognono | 159/1 A |
| 3,304,990 | 2/1967 | Ontko et al. | 159/1 R |
| 3,827,476 | 8/1974 | Biesinger | 159/44 |

*Primary Examiner*—Jack Sofer
*Attorney, Agent, or Firm*—Fleit & Jacobson

[57] ABSTRACT

A method of evaporating liquids to separate solid substances contained therein to form a residue of the substances characterized by applying subatmospheric pressure to at least one discrete portion of the liquid at a first pressure level and subsequently applying subatmospheric pressure to the discrete portion at a second pressure level lower than the first level to gradually evaporate the liquid from the discrete portion thereby leaving a residue of solid substances. Apparatus for performing the foregoing method preferably comprises an enclosure within which a support means is used for supporting at least one discrete portion of the liquid to be separated, a vacuum pump connected to the enclosure for evacuating atmosphere from within the enclosure, and a valve means between the pump and enclosure operable automatically to apply first and second subatmospheric pressure levels to within the enclosure. The apparatus may also be provided with: conduits for supplying cooling fluid to within the enclosure for cooling the liquid to be evaporated; a radiant heating element beneath the support means to heat the liquid to be evaporated; and a vibrator for vibrating the liquid to be evaporated to aid in separation of the liquid from the solid substances desired as a residue.

27 Claims, 4 Drawing Figures

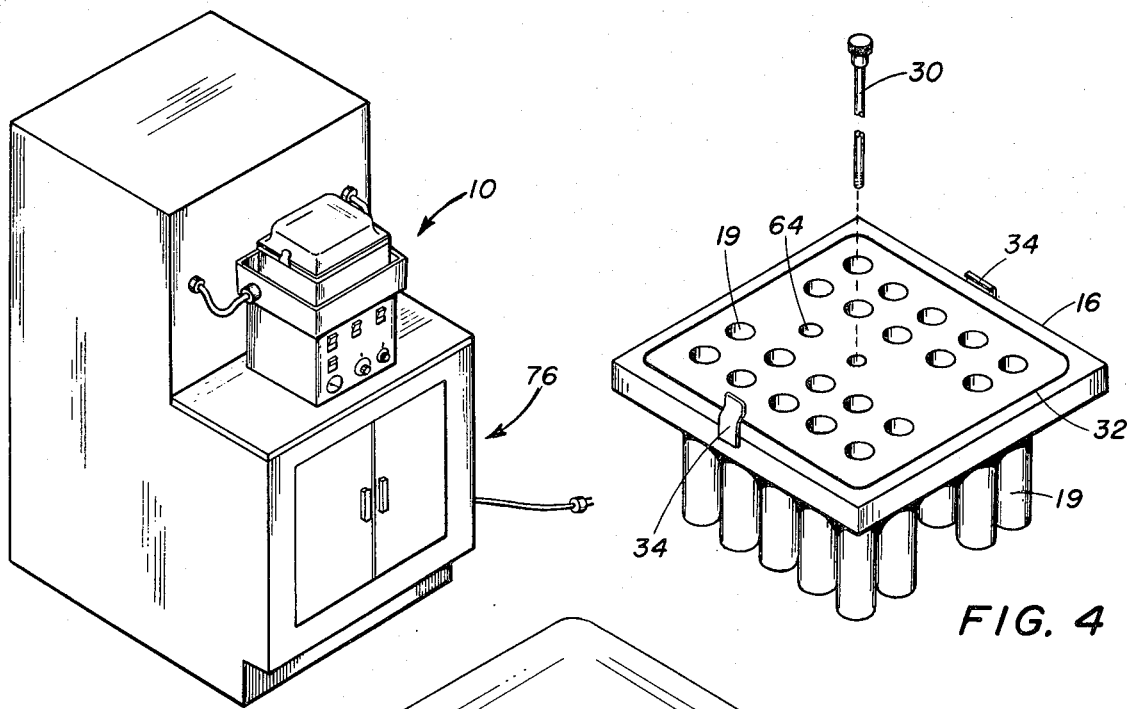
FIG. 2
FIG. 4
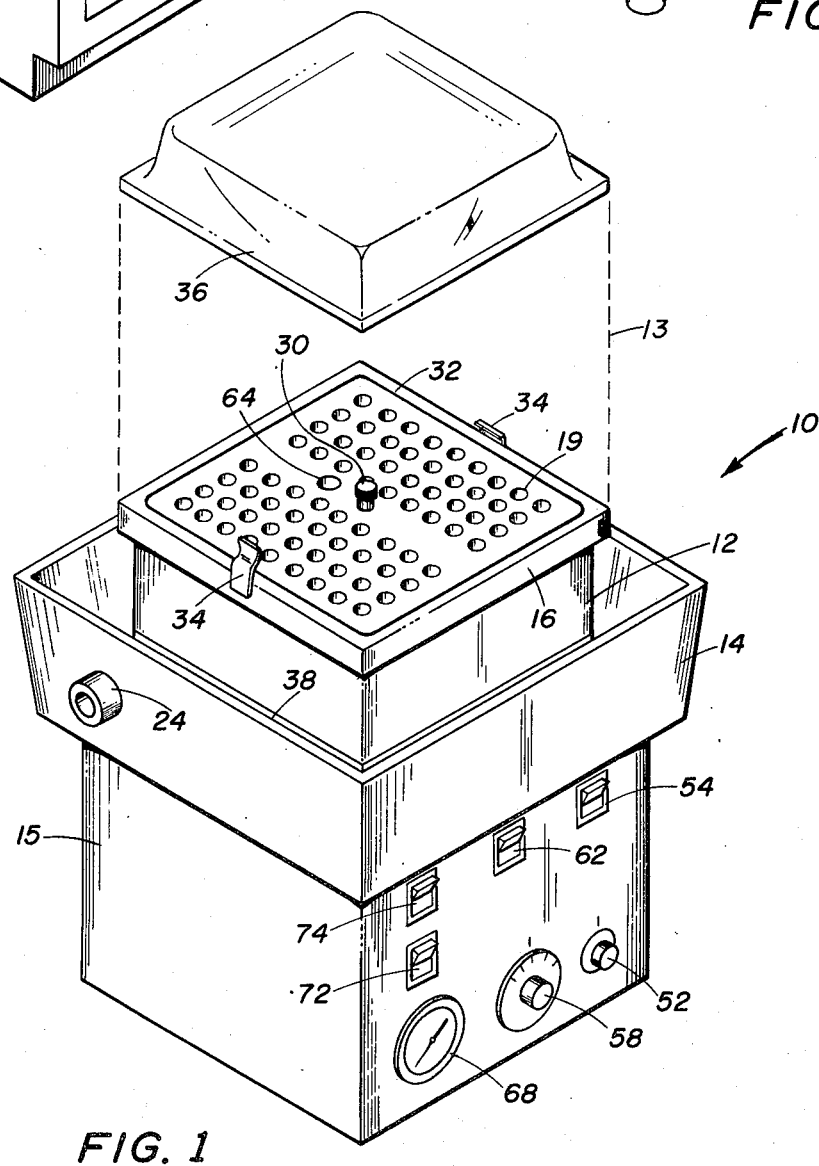
FIG. 1

METHOD AND APPARATUS FOR EVAPORATING LIQUIDS

BACKGROUND OF THE INVENTION

1. Field of the Invention

This invention relates generally to concentrating evaporators of the closed evaporating chamber type and more particularly to methods and apparatus for gradually evaporating liquids to separate solid substances therein to leave a residue of the substances.

2. Brief Description of the Prior Art

Various methods have been used to separate liquids from solid substances, particularly, in the field of medicine, where it is often desirable to analyze various chemical substances. For example, it is often necessary to analyze various constituents found in blood for determining the presence of diseases in persons from whom blood is drawn or, in experimental medicine, for the purpose of analyzing antibodies found in blood, plasma, or serum to develop serums for various diseases. There are, of course, many other reasons for analyzing constituents found in blood, plasma, urine, and the like or to identify various substances found in different medicines and other chemicals. It is often necessary to prepare dry substances for analysis although they may be initially contained in a liquid.

Known methods of separating solid substances from liquids containing such substances include centrifuging the liquids; placing the liquids in ovens to evaporate the liquid; filtering the liquids to collect constituents therein in a filter media; and applying subatmospheric pressure to the liquid to cause it to evaporate thereby leaving a residue of the solid substances contained in the liquid.

While there are advantages and disadvantages to each of the known methods, it is frequently desirable to separate the liquids from the solids by evaporation. One type of apparatus currently available is a vortex evaporator. This apparatus can evaporate liquids by vacuum from individual test tubes that have been shaken in a hot water bath. However, it is desirable to be able to evaporate liquids from several test tubes simultaneously and to control "bumping" of the liquid in the test tubes. This so called bumping results from sudden boiling of the liquid, such as occurs during rapid application of vacuum, which forms bubbles in the liquid and causes the liquid to boil over or spray from the test tubes. Bumping is undesirable since it results in a loss of control of the substances to be analyzed.

Recently developed medical techniques of analysis have made it desirable to be able to obtain several dry residues simultaneously and to be able to selectively cool, heat, or agitate the liquids containing the solid substances. In addition, it is sometimes desirable to mix certain chemicals with the liquids prior to evaporation and to add certain chemicals to the residues after evaporation.

Accordingly, it is an object of this invention to provide a method and apparatus for evaporating liquids to separate solid substances contained therein, without bumping, and to evaporate more than one specimen of a liquid at any one time. It is a further object of this invention to provide additional methods and means for use in connection with the evaporation apparatus such as cooling all or a portion of the specimens being evaporated, heating all or a portion of the specimens being evaporated, and agitating the liquid during evaporation thereof to aid in such evaporation. A still further object is to provide means for subjecting the specimens to be evaporated to an inert gas such as nitrogen rather than to earth atmosphere to prevent contamination of the residue left in the test tubes following evaporation of the liquid.

SUMMARY OF THE INVENTION

These and other objects and novel features are generally accomplished by the method of applying subatmospheric pressure at a first pressure level to at least one discrete portion or specimen of the liquid to be evaporated, applying subatmospheric pressure at a second pressure level lower than the first pressure level to the portion to be evaporated to gradually evaporate the liquid from the discrete portion thereby leaving a residue of solid substances in the specimen tube. The method also encompasses cooling the specimen portion prior to applying the subatmospheric pressure; heating the specimen portion during the application of subatmospheric pressure; and also vibrating the specimen, especially during evaporation of the liquid to aid in such evaporation. Both heating and vibrating may be used simultaneously to aid in the evaporation of certain liquids as may cooling and vibrating simultaneously be used to aid in the evaporation of other types of liquids. Where desirable, the subatmospheric pressure may be applied to a gaseous medium, other than earth atmosphere. In addition, the residue remaining after evaporation may be cooled and vibrated or heated and vibrated for performing certain types of analysis, especially following the addition of certain substances to the residues. If needed, cooling heating, and vibrating may be performed for preselected temperatures and time intervals.

It has been discovered that bumping can be prevented by precooling the liquids prior to applying subatmospheric pressure, by gradually applying subatmospheric pressure or vacuum, and by heating and vibrating the liquids during evaporation.

The apparatus preferred for performing the foregoing methods includes an enclosure within which the specimens to be evaporated are supported, a vacuum pump or other similar means connected to the enclosure for evacuating atmosphere from within the enclosure, and a valve means connected between the vacuum pump and the enclosure that is operable automatically to apply first and second levels of subatmospheric pressure to the specimens within the enclosure. The reason for applying two levels of subatmospheric prssure is that it has been discovered that if the pressurre within the enclosure is gradually reduced, rather than being rapidly reduced, the bumping previously referred to is avoided. This, of course, avoids spillage, waste, and intermixing of liquids contained in various test tubes within the enclosure which might otherwise negative a complete series of tests of various liquids. This is particularly important when only one set of samples or specimens is available for testing. In addition, lost time is avoided as well as the necessity of cleaning up the equipment.

To achieve cooling, heating, and vibrating the liquids, the enclosure is provided with a conduit to supply a cooling fluid or liquid which is circulated beneath the tubes and removed through another conduit, preferably until the liquid in the test tubes reaches some predetermined temperature and with a radiant heating element in the bottom thereof which may be selectively operated to heat the liquid to some predetermined temperature. To achieve vibration of the test tubes, the enclosure is provided with an electro-mechanical vibrator which may be selectively operated to vibrate the complete assembly thereby vibrating the liquid in the test tubes in the enclosure.

BRIEF DESCRIPTION OF THE DRAWINGS

The foregoing methods aand apparatus of the invention will appear more fully from the following detailed description when read in connection with the accompanying drawings. It is to be expressly understood, however, that the drawings are not intended as a definition of the invention but are for the purpose of illustration only. In the drawings wherein like parts are marked alike:

FIG. 1 is an external isometric view of the apparatus of the invention particularly illustrating the enclosure;

FIG. 2 shows the apparatus of FIG. 1 installed on a typical cabinet;

FIG. 4 is an isometric illustration of a support used within the enclosure for supporting test tubes of various sizes.

DESCRIPTION OF THE PREFERRED EMBODIMENT

Figure 3:
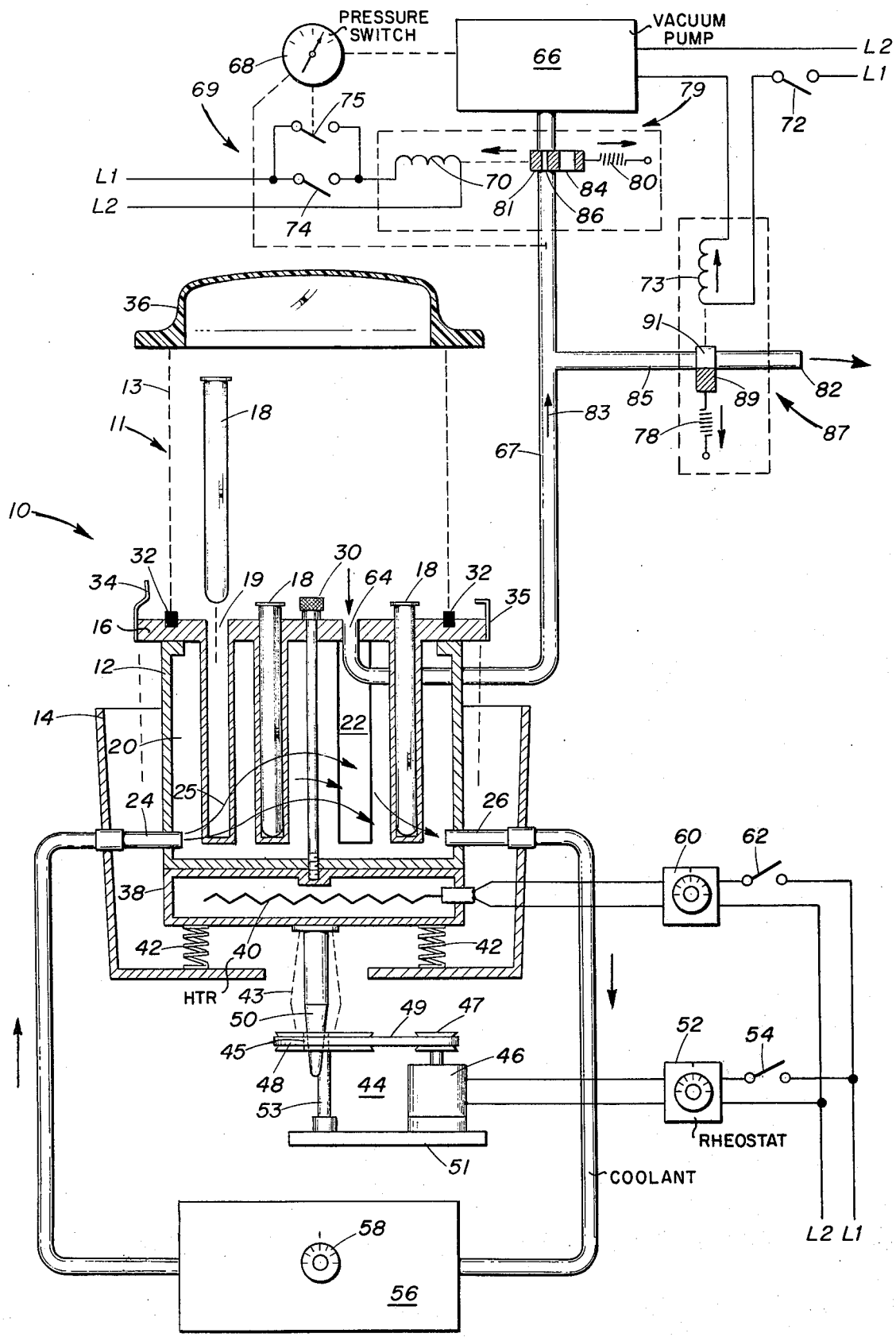
FIG. 3 is a diagrammatic illustration of the apparatus of FIG. 1 showing the various components and construction thereof.

This invention contemplates applying subatmospheric pressure at first and second levels of pressure to liquids containing solid substances to evaporate the liquid therefrom thereby leaving a residue of the substances for analysis or other uses. The first pressure level is applied by evacuating an enclosure within which specimens of the liquid to be evaporated are contained in glass test or specimen tubes. This pressure level is achieved by evacuating atmosphere from within the enclosure at a particular rate for a predetermined time after which atmosphere within the enclosure is evacuated at a faster rate thereby creating a lower level of atmospheric pressure within the enclosure sufficient to evaporate the liquid completely from the specimen tubes thereby leaving a residue of solid substances in the tubes. By gradually evacuating atmosphere from within the enclosure by applying two subatmospheric pressure levels, bumping of the liquid within the specimen tubes and other complications are avoided.

This invention also contemplates cooling or heating or vibrating the liquid contained in the specimen tubes within the enclosure to aid in evaporation of the liquid. If desirable, the liquid in the specimen tubes may be simultaneously heated and vibrated or simultaneously cooled and vibrated. In instances where the residue left in the specimen tubes might be damaged by earth atmosphere, then provision is made for applying subatmospheric pressure to an inert gas, such as nitrogen, within the enclosure.

The apparatus of the invention is best understood by reference to FIGS. 1 and 3. The complete assembly, generally denoted by numeral 10, includes an enclosure generally denoted by numeral 11. The enclosure 11 comprises a lower body 12, an upper body 13 removable from the lower body 12; and a cover 36 secured to the top of upper body 13 A tube support 16 rests upon an upper flange portion of the lower body 12 as best illustrated in FIG. 3. The tube support 16 includes a plurality of test tube receptacles 19 extending downward into the lower body 12 thereby forming a closed cooling chamber 20 (to be described) within the lower body 12 defined by the side and bottom walls thereof, and the tube support 16. The upper flange portion of the tube support 16 is provided with a resilient gasket 32 upon which the lower portion of the upper body 13 rests. The gasket 32 provides a seal so that when the upper body 13 is evacuated, it is sealed from the cooling chamber portion 20. The cover 36, which may be made of transparent plastic if desired, is preferably secured to the top portion of the upper body 13. Similarly, the upper body 13 may also be made of transparent plastic so that the specimen or test tube 18 within the enclosure may be visually inspected during evaporation of liquid from the test tubes.

A long thumb screw 30 passing through the center of the tube support 16 and threaded in the conventional manner into the bottom wall of lower body 12 may be used to tightly secure the tube support 16 to lower body 12. Suitable conventional manually operable catches 34 may be used to secure the upper body 13 to the top surface of tube support 16 so as to draw the upper body tightly against gasket 32. When secured in this manner, the cover 36 and body 13 may be removed from the tube support 16 by unlatching the catches 34.

Therefore, it can be seen that the interior of upper body 13 is sealed from the cooling chamber 20 by the construction of enclosure 11 as described above. It should be understood that the tube receptacles 19 are in the form of tubular members having closed bottom portions so that separation of the interior of upper body 13 is maintained between it and the cooling chamber 20. It should also be understood that the tube receptacles 19 may be made of various sizes to accommodate different sizes of test tubes 18. Preferably, the tube receptacles are made such that a test tube 18 slides easily therein with a portion of tube 18 extending slightly above the upper surface of tube support 16 to facilitate removal of the tube as best illustrated in FIG. 3. FIG. 4 also illustrates a support 16 wherein the tube receptacles 19 are of larger size than those shown in FIG. 3 to accommodate larger sizes of test tubes 18. If desired, the tube support 16 may be made with tube receptacles 19 of different sizes to accommodate different size test tubes in the same support.

Evacuation of the interior of upper body 13 of enclosure 11 is achieved by a conventional vacuum pump 66 connected to enclosure 11 by conduit 67 terminating in a vacuum port 64 in the support 16. Vacuum pump 66 may be of any suitable type such as an electric motor operated diaphragm pump or a vane type pump both of which are commonly available and the construction and operation of which are well known to those skilled in the art. Preferably, the pump operates at a constant speed so that when it is turned on, the atmosphere within the upper body 13 is evacuated through port 64, through conduit 67, and to atmosphere through the pump 66 in the conventional manner. If desired, the exhaust from pump 66 may include a condensing coil (not shown) which may be used to condense the liquid evaporated from tubes 18.

First and second levels of subatmospheric pressure are provided within the upper body 13 by a conventional electric solenoid operated valve assembly generally denoted by numeral 79 which is connected to conduit 67 as schematically illustrated in the upper portion of FIG. 3. The valve 79 includes a large port 84 and a small port 86 in a spool portion 81 of the valve. The spool 81 is horizontally slidable (as viewed in FIG. 3) within a valve body (not shown) so that either port 84 or port 86 may be placed into alignment with conduit 67. Thus, it can be seen that as vacuum pump 66 is operated to withdraw atmosphere from upper body 13 through conduit 67 in the direction of arrow 83, the small port 86 will restrict the flow of atmosphere through the spool 81 to the exhaust (not shown) of vacuum pump 66. This then provides evacuation of the interior of upper body 13 at a rate that is dependent upon the size of port 86, and the capacity of pump 66. It can also be seen that when large port 84 is placed in alignment with conduit 67, the flow of atmosphere through the conduit is unrestricted, the size of port 84 being made substantially the same as the diameter of conduit 67. Thus, atmosphere will be evacuated from the interior of upper body 13 at the maximum rate provided by the vacuum pump 66. This arrangement provides for the application of the first and second levels of subatmospheric pressure to the interior of upper body 13 of enclosure 11 and results in a gradual reduction of atmospheric pressure within upper body 13.

The valve assembly 70 is a conventional electric solenoid-operated, single acting, spring reutrn valve. That is, spring 80 acts to pull the spool 81 to the right as viewed in FIG. 3 so that the small port 86 tends to remain in alignment with conduit 67 when the electric solenoid 70 is de-energized. Upon energization of the electric solenoid 70, the spool 81 will be pulled to the left thereby placing port 84 into alignment with conduit 67.

Conduit 67 is also provided with a branch conduit 85 connected as illustrated in FIG. 3 in which a solenoid operated valve 87 assembly (similar to solenoid operated valve 79) is connected. Valve 87 includes a valve spool 89 including a single port 91 that is substantially the same diameter as branch conduit 85. Branch conduit 85 terminates in a vacuum release port 82 to atmosphere. Thus, with the valve spool 89 in the position illustrated in FIG. 3, with the port 91 in alignment with branch conduit 85, the interior of upper body 13 is open to atmosphere through vacuum port 64, conduit 67, branch conduit 85, and vacuum release port 82. However, when the valve spool 89 is moved upward, (as viewed in FIG. 3), the branch conduit 85 is closed to atmosphere and, consequently, upper body 13 is closed to atmosphere.

Electric current is supplied to vacuum pump 66 through lead L1 and returned to ground through lead L2. A conventional on/off switch 72 is connected in lead L1 so that, upon closure of switch 72, current flows through L1 then through solenoid 73 of valve 87 and on to vacuum pump 66. Current passing through solenoid 73 pulls the valve spool 89 upward to close vacuum release port 82 in branch conduit 85 to atmosphere. However, no current is yet supplied through L1 to solenoid 70 of valve 79 as will be explained; therefore, the spring 80 maintains the valve spool 81 in the position shown at the top of FIG. 3. Thus, as the vacuum pump begins to evacuate atmosphere from within upper body 13, the atmosphere is caused to flow through the small port 86 at a restricted rate. When the subatmospheric pressure level in conduit 67 reaches a predetermined level, which is indicative of the subatmospheric pressure in the interior of upper body 13, a conventional pressure operated electrical switch 68 is actuated to close switch 75 in L1 to solenoid 70. Solenoid 70 then pulls the valve spool 81 to the left thereby placing large port 84 in alignment with conduit 67. This permits the atmosphere from within upper body 13 to be withdrawn at a faster rate by the vacuum pump 66. Thus, the valve means 81 and 87 automatically provides first and second predetermined levels of subatmospheric pressure within the interior of upper body 13. The pressure switch 68 may include a dial as shown to indicate the pressure level within conduit 67; it may also include an adjustment (not shown) to control the pressure level at which the switch 75 is closed. This permits selective control of the pressure levels applied to the upper body 13 to suit various characteristics of the liquids being evaporated. L1 supplying current to solenoid 70 may also include a by-pass switch 74 which can be manually operated to supply current to solenoid 70 to by-pass automatic operation of the valve 79 by pressure switch 68 to evacuate atmosphere from within upper body 13 at a faster rate at any time desired, even from the initial evacuation of upper body 13.

It should also be noted that when the vacuum pump 66 is turned on by switch 72, the valve spool 89 automatically closes the branch conduit 85 to atmosphere. Likewise, when switch 72 is opened, the spring 78 returns the valve spool 89 to the position shown in FIG. 3 so that atmosphere is admitted through vacuum release port 82 into the interior of upper body 13. This permits upper body 13 to be easily removed.

If deisred, vacuum release port 82 may be releasably connected to a source of inert gas (not shown) which may be supplied under pressure through branch conduit 85 and conduit 67 to the interior of upper body 13 when the valve spool 89 is in the open position as shown. Then, when the vacuum pump 66 is started, the conduit 85 will close as previously explained and the inert or other gaseous medium may be withdrawn as previously explained from the upper body 13 to evaporate the liquids in test tubes 18. When evaporation is complete and the vacuum pump is shut off, the spool 89 will return to its open position thereby permitting additional inert gases to flow back into the interior of upper body 13.

If necessary, the complete assembly 10 may be placed in a "clean" room, where even the atmosphere is sterile, and the upper body 13 removed from the support 16 and thereafter the test tubes 18 removed for analysis of their residue content or, if desired, they may remain in the tube support 16. If sterile analysis is not required, the source of inert gas may be disconected from the vacuum release port 82 and atmosphere permitted to enter upper body 13 as previously described.

It is better to cool the liquid in test tubes 18 before evaporation of the liquids therefrom. Thus, premature boiling of the liquids does not occur and bumping is prevented. To accomplish this, the cooling chamber 20, which is isolated from the remainder of the assembly as previously described, is provided with a flow of cooling fluid which enters the cooling chamber 20 through conduit 24 and exits from chamber 20 through conduit 26 as shown by the direction of arrows 25. A refrigeration unit 56 may be used to furnish the cooling fluid through the conduit 24 to the cooling chamber 20. The refrigeration unit 56 may include a thermostatic temperature control 58 to control the temperature of the fluids supplied to the chamber 20. The refrigeration unit 56 is preferably of the type to provide a flow of cold air through conduit 24 which cools the tube receptables 19 and thereby cools the liquid in test tubes 18 but may be of the type to supply cold water through conduit 24 into lower body 12. However, should it be desirable to provide a temperature lower than 32°F, to cooling chamber 20, a liquid such as alcohol may be used to prevent freezing of the liquid in the conduits.

It is often desirable to heat the liquids being evaporated to aid in evaporation. To accomplish this, the lower body 12 may be provided with a closed heating chamber 38, such as illustrated in FIG. 3, in which a heating element 40 is mounted. Heating element 40 may be a conventional electrical resistance type element such as shown in FIG. 3, or, if desired, a heat lamp may be satisfactorily used by providing a suitable socket (not shown) in the wall of the heating chamber 38. The heat provided by heating element 40 radiates to the walls of the heating chamber 38 and is conducted to the lower portion of lower body 12 and to some extent to the side walls of body 12 so that the atmosphere within cooling chamber 20 is heated by convection. This of course, heats the test tubes 18 through test tube receptacles 19.

Current is supplied to heating element 40 through lead L1 first passing through a manually operable on/off switch 62 and then through heating element 40 and back to ground through L2. If desired, a conventional thermostat switch may be connected to the lines L1 and L2 to provide a temperature control to adjust the heat supplied by heating element 40 to suit the type of liquid to be evaporated.

It is often helpful to vibrate the liquid in the test tubes 18 during evaporation of the liquid from within the test tubes. To achieve this, the enclosure 11 is mounted to a base 14 surrounding enclosure 11 by a number of coil springs 42. The springs may be held in place by a screw (not shown) passing through the lower part of base 14, through the center of the coil springs 42, and into the lower portion of the heating chamber 38. Preferably, the screw is threaded into the lower part of the chamber 38 so as to slightly compress the springs upon which the enclosure 11 is resting. This permits the complete enclosure 11 to vibrate with respect to the base 14.

Vibration of enclosure 11 is provided by a vibrator assembly generally denoted by numeral 44. Vibrator assembly 44 includes a base 51 suitably secured to the base 14 upon which is mounted a variable speed D.C. electric motor 46 and a support shaft 53 as shown in FIG. 3. The output shaft of motor 46 includes a pulley 47; a larger pulley 48 is mounted for concentric rotation about the support shaft 53. The two pulleys are connected by a conventional drive belt 49. Thus when the motor 46 is operated, the pulley 48 is caused to rotate. The pulley 48 also includes a hole 45 located off center that is, eccentrically, with respect to the center of rotation of the pulley. A tapered pin 50, rigidly secured to the bottom of heating chamber 38, passes loosely through the eccentric hole 45 in the pulley 48. Thus, upon rotation of pulley 48, the lower end of pin 50 is caused to eccentrically revolve around the center of rotation of pulley 48 at a slight distance therefrom as denoted by dotted line 43. Since the pin 50 is rigidly secured to the bottom of heating chamber 38, the complete enclosure 11 is caused to vibrate and is free to do so because of the resilient mounting provided by springs 42 previously described.

Current to motor 46 is provided through lead L1 first passing through a manually operable on/off switch 54, then through the motor 46 and back to ground through lead L2. A conventional rheostat control 52 may be connected to leads L1 and L2 to provide an adjustment for the speed of D.C. motor 46 to thereby control the frequency of vibration supplied to the enclosure 11.

The apparatus described for assembly 10 may be placed in a cabinet 15 such as illustrated in FIG. 1 by suitably securing base 14 thereto. Cabinet 15 may include a suitable mounting for the various controls already described such as for the main on/off switch 72 for the vacuum pump 66, the manual by-pass switch 74 for solenoid 70, the pressure switch 68 used to close switch 75 for automatically switching the valve spool 81, the heater control 60 for controlling the amount of heat supplied by heating element 40, the speed control 52 used to adjust the amount of vibration supplied to the enclosure 11, and the thermostat control 58 for the refrigeration unit 56. The assembly 10 mounted on cabinet 15 may also be mounted to a console 76 as best shown in FIG. 2. The lower part of the console 76 may be used to enclose the refrigeration unit 56 and the vacuum pump 66. This arrangement provides a compact, easily operated unit which may be made portable by mounting wheels (not shown) on the bottom of the console 76 so that it may be moved to where it is needed.

In operation, one, or as many test tubes as are desired, is filled with the liquid to be evaporated and placed in tube receptacle 19 in the tube support 16. The upper body 13 is placed on the gasket 32 and secured thereto by the catches 34. If no cooling, heating, or vibration is to be used, then the main switch 72 is closed thereby starting the vacuum pump 66 which begins to withdraw the atmosphere from within upper body 13 through the small port 86 in valve spool 81 to gradually reduce the pressure in upper body 13 to a first level of subatmospheric pressure. When the pressure in upper body 13 is reduced to the desired amount, the pressure switch 68 automatically closes switch 75 thereby providing current to solenoid 70 to pull the valve spool 81 to the left as viewed in FIG. 3 to position the large port 84 in alignment with conduit 67. At this point, the atmosphere within the upper body 13 will be withdrawn at a greater rate to reduce the pressure in upper body 13 to a second level of subatmospheric pressure. The vacuum pump continues to run until the liquid is evaporated from tubes 18 at which time the vacuum pump may be shut down by opening switch 72. When this occurs, the valve spool 89 is automatically moved downward as viewed in FIG. 3 because of the spring 78. This places the port 91 in alignment with branch conduit 85 so that the vacuum relief port 82 is opened to atmosphere thereby permitting atmosphere to enter the upper body 13.

At this time, the catches 34 may be unlatched so that the upper body 13 may be removed from support 16 and the test tubes 18 removed from the receptacles and taken for analysis of their contents. If cooling is to be supplied, then the thermostat 58 may be adjusted to supply the desired amount of cooling to the unit. If heat is to be supplied during evaporation, the thermostat 60 may be adjusted to the desired temperature before the heat is turned on with switch 62. It may also be desirable to either preheat or precool the tubes 18 prior to turning on the vacuum pump so that the test tubes are at the desired temperature prior to evacuation to cause evaporation. The switch 54 may be closed and the control 52 adjusted to provide the amount of vibration desired before and/or during evaporation.

The method and apparatus previously described are particularly useful in those instances where it is necessary to obtain solid substances contained in a liquid, such solids being dissolved or suspended in the liquid or even contained in the form of a gel. For example, medical doctors often wish to study the concentration of various substances in the blood. To best accomplsih this, it is often necessary to extract such substances from the blood or from plasma or serum prior to study. In such extraction, a sample or specimen of the liquid is usually mixed with a volatile liquid that will extract the substance to be studied or measured. Mixing is preferably accomplished by shaking the liquids in a container. This can easily be accomplished by the present invention by placing the test tube containing the mixture in support 16 and energizing the vibrator 44 by means of switch 54. Additional test tubes may contain measured amounts of control or comparison liquids. All the liquids may then be simultaneously evaporated as previously described. The residues in the tubes may then be subjected to various tests such as, for example, radioimmunoassay which is a recently developed technique used to determine minute quantities of some substance within other substances. The immunoassay technique can be carried out in the apparatus of the invention without transferring the residues to other containers since the apparatus includes most everything needed to perform the technique. For those tests requiring it, various solvents or other chemicals may be added to the residues which may then be mixed by agitating them as previously described, and/or by heating or cooling them. A specific example would be to use the technique to identify and measure minute quantities of hormones or other secretions of the body in the blood or urine taken from a patient. A more specific example would be the immunoassay of aldosterone in the plasma of patients. Thus, it can be seen that the invention is useful to evaporate liquids containing solid substances to provide dry solids for whatever analysis or study that is needed.

Thus, having described the invention in its best embodiment and mode of operation, that which is desired to be claimed by Letters Patent is:

1. Apparatus for separating liquids from solid substances to form a residue of said substances, comprising:
   an enclosure means;
   support means within said enclosure means for supporting at least one discrete portion of said liquids;
   pump means connected to said enclosure means for evacuating gaseous matter from within the enclosure means; and,
   valve means between said pump means and said enclosure means, the valve means comprising
   conduit means disposed between the pump means and the enclosure means,
   port means disposed in the conduit means for restrictively controlling the evacuation of gaseous matter from the enclosure means, the port means including a relatively small port movable into alignment with the conduit means to restrict the flow of gaseous matter from said enclosure means in order to create subatmospheric pressure therein at a first pressure level, the port means further including a relatively larger port movable into alignment with the conduct means subsequent to the establishment of said subatmospheric pressure level within the enclosure means to restrict the flow of gaseous matter from said enclosure means in order to create subatmospheric pressure at a second relatively lower pressure level within the enclosure means, and
   actuation means for moving the port means within the conduit means in order to align either the small port or large port with the conduit means, liquid being thereby evaporated from the discrete portion of the liquids to leave a residue of said solid substances.

2. The apparatus of claim 1 and further comprising: cooling conduit means connected to said enclosure means for directing a cooling fluid into a portion of said enclosure means for cooling said discrete portion to a preselected temperature.

3. The apparatus of claim 1 and further comprising: a second support means;
   resilient means mounting said enclosure means to said second support means for relative movement there between; and
   electro-mechanical vibrating means connected to said enclosure means for vibrating said enclosure means at a predetermined frequency.

4. The apparatus of claim 1 wherein:
   said support means comprises a plurality of tubular receptacles for supporting an array of test tubes containing discrete portions of said liquids, said support means separating said enclosure means into top and bottom chambers,
   said top chamber being adapted for evacuation of atmosphere therefrom to evaporate the liquid in said discrete portions of said liquids, and
   said bottom chamber adapted for selective application of heat and cold to said tubular receptacles.

5. The apparatus of claim 1 and further comprising:
   a radiant heating element in said enclosure means beneath said discrete portion for heating said discrete portion to a preselected temperature.

6. The apparatus of claim 1 and further comprising: heating means in said enclosure means for heating said discrete portion to a predetermined temperature prior to evaporating the liquid from said discrete portion.

7. The apparatus of claim 1 and further comprising: cooling means connected to said enclosure means for cooling said discrete portion to a predetermined temperature prior to evaporating the liquid from said discrete portion.

8. The apparatus of claim 1 and further comprising: vibrating means connected to said enclosure means for vibrating said discrete portion for a predetermined time interval.

9. The apparatus claim 1 and further comprising: heating and vibrating means connected to said enclosure means for selectively heating and vibrating said discrete portion for selected time intervals.

10. The apparatus of claim 1 and further comprising: cooling and vibrating means connected to said enclosure means for selectively cooling and vibrating said discrete portion for preselected time intervals.

11. The apparatus of claim 1 wherein said actuation means further comprises:
    a first solenoid actuator for moving said port means;
    a second conduit means with a valve therein connected to said enclosure means; a second solenoid actuator for controlling said valve associated with the second conduit means for closing the interior of the enclosure means to the atmosphere while subatmospheric pressure conditions exist within the enclosure means; and means for energizing the second solenoid actuator upon discontinuation of the operation of the pump means for venting the enclosure means to the atmosphere, thereby relieving the subatmospheric pressure within the enclosure means.

12. The apparatus of claim 11 wherein the actuation means further comprises:
switch means responsive to the attainment of the first pressure level within the enclosure means for enabling said first solenoid actuator to move the relatively small port out of alignment with the conduit means and to move the relatively larger port into alignment with said conduit means, thereby allowing the evacuation of the enclosure means to the second subatmospheric pressure level.

13. The apparatus of claim 12 wherein the actuation means further comprises:
meanually operable switch means by-passing the first-mentioned switch means for enabling the first solenoid actuator to align the relatively larger port with said conduit means thereby allowing the evacuation of the enclosure means to the second subatmospheric pressure level.

14. An apparatus for evaporating liquids from a plurality of specimens to separate solid substances therefrom, the apparatus comprising:
an enclosure means for housing said plurality of specimens;
support means within said enclosure means for receiving and supporting said specimens;
connector means for associating a pump with said enclosure means to enable the evacuation of said enclosure means;
means for initiating the evacuation of said enclosure means from a first initial pressure level to a second and lower pressure level;
valve means for controlling the evacuation of said enclosure means so that the evacuation is initially at said first pressure level and is then subsequently at said second and lower pressure level; p1 means for determining the pressure level in said enclosure means; and
valve actuator means responsive to the pressure level in said enclosure means for operating said valve means to effect a change in pressure level from said first to said second pressure levels thereby gradually evaporating the liquids from said specimens and leaving a residue of said solid substances.

15. The apparatus of claim 14 further including:
conduit means connected to said enclosure means for directing a cooling fluid into a portion of said enclosure means for cooling said specimens prior to evaporating said liquids.

16. The apparatus of claim 14 further including:
a radiant heating element in said enclosure means beneath said specimens for heating said specimens during evaporation of said liquids.

17. The apparatus of claim 14 further including:
a second support means;
resilient means mounting said enclosure means to said second support means for relative movement therebetween; and
electro-mechanical vibrating means connected to said enclosure means for vibrating said enclosure means at a predetermined frequency.

18. The apparatus of claim 14 wherein:
said support means includes a plurality of tubular receptacles for supporting an array of test tubes containing said specimens, said support means defining top and bottom chambers,
said top chamber adapted for evacuation of atmosphere therefrom to evaporate the liquids, and
said bottom chamber adapted for selective application of cold and heat to said tubular receptacles.

19. The apparatus of claim 14 wherein said valve means includes:
a first solenoid actuator in a conduit between said connector means and said enclosure means, said actuator including a small port for restricting the flow of atmosphere from said enclosure means to create subatmospheric pressure at said first pressure level in said enclosure means and a large port for restricting the flow of atmosphere from said enclosure means to create subatmospheric pressure at said second pressure level in said enclosure means; and
a second solenoid actuator, connected to said conduit, closing the interior of said enclosure means to atmosphere during application of said subatmospheric pressure to within said enclosure means and operable, upon deactivation of said pump, to relieve said subatmospheric pressure within said enclosure means.

20. The apparatus of claim 19 further including:
switch means operable in response to said first pressure level in said enclosure means reaching a predetermined magnitude to shift said first solenoid actuator in said conduit to align said large port with said conduit to automatically apply said second subatmospheric pressure level to within said enclosure means.

21. The apparatus of claim 20 further including:
manually operable switch means for by-passing said switch means for shifting said first solenoid actuator to align said large port with said conduit to apply said second subatmospheric pressure level to within said enclosure means.

22. The apparatus of claim 14 wherein said valve means is intermediate said connector means and said enclosure means.

23. The apparatus of claim 14 wherein said support means is an integral part of said enclosure means, forming one wall thereof.

24. The apparatus of claim 23 wherein said support means is a rigid heat conducting plate having a plurality of recesses therein for receiving test tubes and the like.

25. A method for evaporating liquids from a plurality of specimens so as to prevent bumping of the liquids or boiling thereof, the method comprising the steps of:
cooling said plurality of specimens at a first pressure level;
reducing the ambient pressure of said plurality of specimens from said first pressure level to a second lower pressure level; and
vibrating said plurality of specimens to inhibit localized heating thereof beyond the boiling point of the liquid.

26. The method of claim 25 wherein said first pressure level is substantially atmospheric pressure.

27. The method of claim 25 and further comprising the step of heating said plurality of specimens while the ambient pressure of said plurality of specimens is being reduced from said first to said second pressure levels.

* * * * *